United States Patent
Minyard (10) Patent No.: US 6,658,660 B1
(45) Date of Patent: Dec. 2, 2003

(54) SYSTEM AND METHOD OF AUTOMATICALLY MODIFYING SOURCE CODE FOR MARSHALING, UNMARSHALING AND MARKING MODIFIED DATA OBJECTS

(75) Inventor: Trenton Corey Minyard, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/477,785

(22) Filed: Dec. 31, 1999

(51) Int. Cl.[7] .................................................. G06F 9/44
(52) U.S. Cl. ..................... 717/171; 717/106; 717/120; 717/141; 717/147; 717/149; 717/169; 717/127; 717/128; 717/129; 717/130
(58) Field of Search ................................ 717/106, 120, 717/141, 147, 149, 169, 171; 709/328

(56) References Cited

U.S. PATENT DOCUMENTS

| | | | | |
|---|---|---|---|---|
| 5,787,413 A | * | 7/1998 | Kauffman et al. .............. 707/2 |
| 5,920,725 A | * | 7/1999 | Ma et al. ..................... 707/203 |
| 5,991,535 A | * | 11/1999 | Fowlow et al. .............. 717/107 |
| 6,032,199 A | * | 2/2000 | Lim et al. .................... 709/316 |
| 6,044,409 A | * | 3/2000 | Lim et al. .................... 709/315 |
| 6,128,771 A | * | 10/2000 | Tock et al. ................... 717/111 |
| 6,226,788 B1 | * | 5/2001 | Schoening et al. .......... 709/203 |
| 6,345,282 B1 | * | 2/2002 | Minyard ...................... 707/203 |
| 6,446,070 B1 | * | 9/2002 | Arnold et al. ................. 707/10 |

OTHER PUBLICATIONS

Agarwal, D. A., Moser, L. E., Melliar–Smith, P.M., Budhia, R. K., "The Totem Multiple–Ring Ordering and Topology Maintenance Protocol", May 1998 ACM Transactions on Computer Systems, p. 93–132. retrieved from the ACM database on Sep. 3, 2002.*

Moser, L.E., Melliar–Smith, P.M., Agarwal, D.A., Budhia, R.K. and Lingley–Papadopoulos, C.A., "Totem: A FaultTolerant Multicast Group Communication System", Communications of the ACM, Apr. 1996, retrieved from the ACM database on Sep. 3, 2002.*

Srinivasan, R., "XDR: External Data Representation Standard", Aug. 1995, http://www.faqs.org/frc1832.html, retrieved through www.google.com search engine Sep. 4, 2002.*

Srinivasan, R., "RPC: Remote Procedure Call Protocol Specification Version 2", Aug. 1995, http://rfc.sunsite.dk/rfc/rfc1831.html, retrieved Sep. 4, 2002.*

*Network Interfaces Programmer's Guide*, Sun Microsystems, Inc. (1994), Chapter 3, Appendices A–C.

* cited by examiner

*Primary Examiner*—Tuan Q. Dam
*Assistant Examiner*—Mary Steelman
(74) *Attorney, Agent, or Firm*—Carr LLP (57) ABSTRACT

A computer (100) and a method (200) are provided for automatically generating source code (132) readily operable in a fault-tolerant system or a distributed system, from source code (130) non-operable in either a fault-tolerant system or a distributed system. The computer (100) preferably includes a programmer's computer system including a CPU (104), storage media (108–118), I/O interface 142, input device (144), output device (146). The computer (100) analyzes the source code (130), and automatically generates source code (132), which is then stored in the storage medium (132). The source code (132) contains additional lines of code for marshaling, unmarshaling, and marking modified data objects.

22 Claims, 4 Drawing Sheets

SYSTEM AND METHOD OF AUTOMATICALLY MODIFYING SOURCE CODE FOR MARSHALING, UNMARSHALING AND MARKING MODIFIED DATA OBJECTS

TECHNICAL FIELD

The invention relates generally to software design and, more particularly, to a system and method for automatically modifying source code for performing the operations of marshaling, unmarshaling and marking modified data objects in a fault-tolerant system or in a distributed system.

BACKGROUND OF THE INVENTION

Distributed systems based on multiple inexpensive computers ("processors") interconnected by a communication network, such as a Totem System or other Virtual Synchrony system, have many applications. The overall performance of distributed systems may be comparable to more expensive systems, so long as the application may be distributed among many processors.

To provide a distributed system with fault tolerance, information in one processor must be replicated in other processors. Such replication requires information to be transferred between processors. It is also important that such information remain consistent between the processors.

Fault-tolerant systems, whether or not a distributed system, requires that information ("data objects") in a primary processor be transferred to a standby processor. In a real-time system, when the primary processor fails, the standby processor should be able to take over all the operations of the primary processor without delay until the primary processor is restored to resume its function as the primary processor.

In distributed systems and fault-tolerant systems, communication of data objects between processors is crucial to the overall performance and reliability of such systems. To transfer data objects, however, data objects must first be marshaled (i.e., converted into a form that may be transmitted over a network) before being transmitted through the network, and then be unmarshaled (i.e., converted from the network form back into data objects) after being received. Also, it is preferable for the sake of efficiency to track and mark data objects which have been modified, and to only transmit modified objects to other processors to update information. The task of marshaling, unmarshaling, and marking modified data objects may be performed by special hardware equipment installed in such systems. However, such hardware equipment can be costly.

As an alternative to using hardware, data objects may be transmitted between processors by incorporating, into an application program, source code for marshaling, unmarshaling and marking modified data objects. This would require that a programmer write source code for marshaling, unmarshaling and marking modified data objects in each and every application program before compiling the program. Such a task, however, is time-consuming, inefficient, and prone to errors.

In a further alternative to using hardware or source code described above, data description languages, such as CORBA's Interface Description Language (IDL), may be used to automatically generate code for marshaling and unmarshaling operations. The IDL compiler receives the IDL description of all the objects to be transferred and converts it into an actual programming language description of the objects. This requires that a programmer first describe in IDL all the data objects he or she wishes to transfer. Unless the programmer designs the application in IDL, it is inefficient and time-consuming to describe all the data objects in IDL when the data objects are used in other programming languages, such as C++ or Java. Furthermore, IDL does not mark data objects as "dirty" (i.e., modified, but generally excluding transient modifications) when they are modified since it cannot deal with the actual target language.

Accordingly, it would be beneficial to develop a more efficient and reliable method and/or a system for automatically modifying source code for marshaling, unmarshaling, and marking modified data objects.

SUMMARY

The present invention accordingly provides a method and system which automatically modify source code to be readily operable in a fault-tolerant system or a distributed system for marshaling, unmarshaling and marking modified data objects. In a method for automatically modifying source code operable in a computer network having two or more interconnected processors, source code of an application is first loaded into storage memory of a computer. The source code is then modified to marshal data objects associated with the application into a buffer, and to unmarshal the marshaled data objects from the buffer. The source code may optionally also be analyzed to identify lines of code that modify data objects, and mark modified data objects in the appropriate places in the code.

A technical advantage of the present invention includes enhancing the efficiency in designing applications running in a distributed system or a fault-tolerant system. Such an advantage is a result of automating the otherwise time-consuming process of writing additional lines of code for marshaling, unmarshaling and marking modified data objects in each and every application developed. Accordingly, coding applications for a fault-tolerant or distributed system is significantly streamlined, thus reducing the time required to introduce a new product to the market. Also, such applications are less prone to errors due to the automation of adding lines of code.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION

Figure 1:
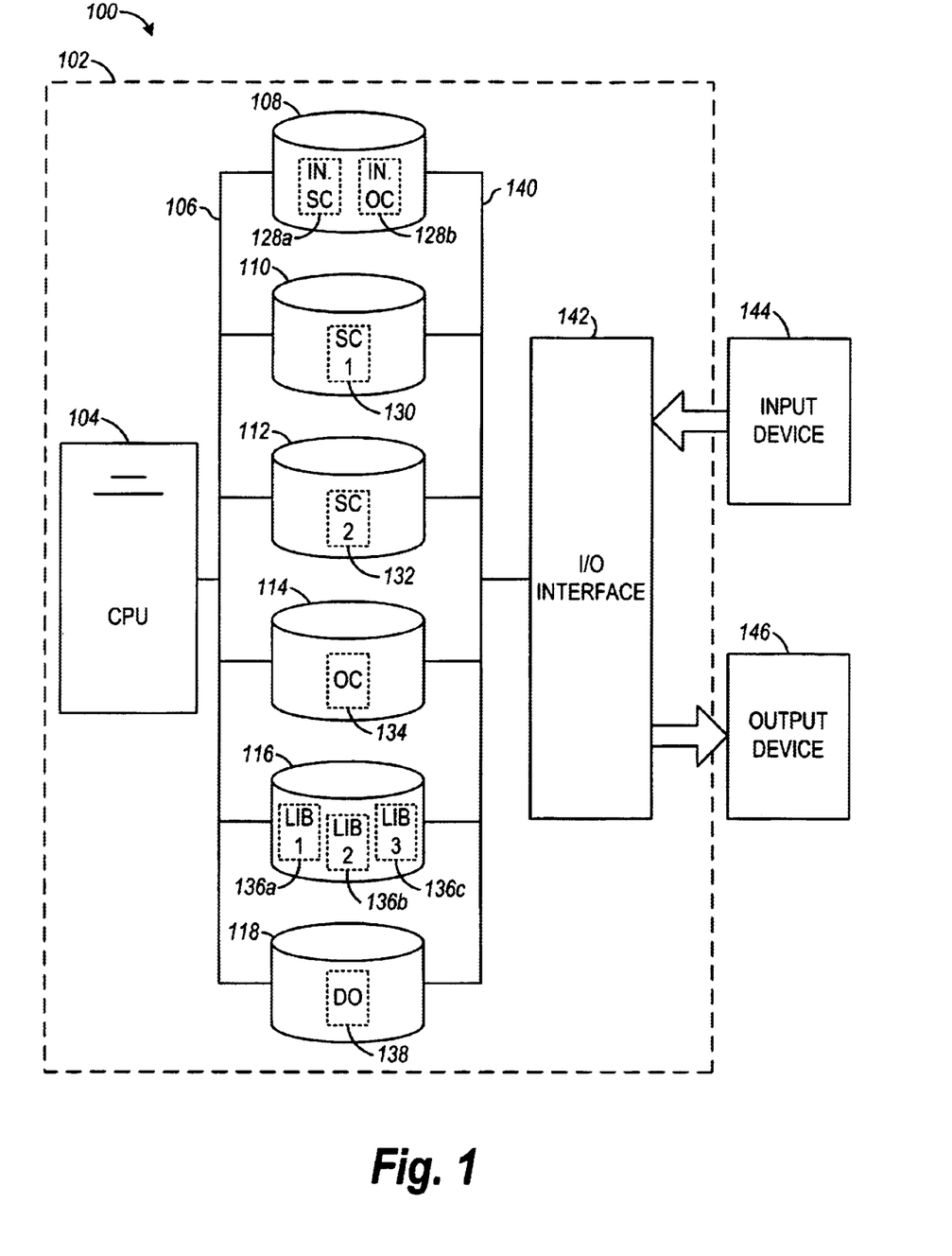
FIG. 1 illustrates a high-level schematic diagram of a computer system for automatically modifying source code not readily operable in a fault-tolerant system or a distributed system into source code that is readily operable either in a fault-tolerant system or in a distributed system.

Referring to FIG. 1 of the drawings, the reference numeral 100 generally designates a computer system embodying features of the present invention for developing an application program executable on at least one of any type of distributed system, such as TCP/IP network, an X.25 network, or is executable on a fault-tolerant system, such as a virtual synchrony network, including a Totem network, or the like.

The computer system 100 includes a computer 102 such as a personal computer, a workstation, or a more complex computer such as a mainframe. Generally, the computer 102 includes a central processing unit (CPU) 104 connected via a bus 106 for data communication to and from storage media 108, 110, 112, 114, 116, and 118. The storage media 108, 110, 112, 114, 116, and 118 may comprise volatile and/or non-volatile media, and may include but is not limited to read-only memory (ROM), random access memory (RAM), a hard drive memory, and the like. Each storage medium 108, 110, 112, 114, 116, and 118 may represent a separate storage medium or a portion of a single larger storage medium.

Each of the storage media 108, 110, 112, 114, 116, and 118 are connected via a bus 140 to an input/output interface 142 for receiving data and transmitting data from an input device 144 and an output device 146, respectively. The input device 142 may, for example, comprise a keyboard, a mouse, or the like. The output device 144 may, for example, comprise a display device (such as a monitor), a printer, or the like.

As exemplified in FIG. 1, a number of data files 128a, 128b, 130, 132, 134, 136a, 136b, 136c, and 138 containing program code may be stored in storage media 108, 110, 110, 112, 114, 116, 116, 116, 116, and 118, respectively. More specifically, the data files 128a and 128b stored in the storage medium 108 contain the source code and object code, respectively, of a code instrumenter effective for reading in source code and automatically modifying the source code to be readily operable in a fault-tolerant system and/or a distributed system, as discussed further below. The data file 130 stored in storage medium 110 contains source code ("SC 1") that defines an application program designed to run in a distributed or fault-tolerant system. The source code 130, however, is not effective for marshaling, unmarshaling, and marking modified data objects. In accordance with the prior art, a programmer would be required to write additional source code for marshaling, unmarshaling, and marking modified data objects.

In accordance with the operation of the present invention, however, additional source code for marshaling, unmarshaling, and marking modified data objects is provided by the code instrumenter defined by the object code in the file 128b stored in the storage medium 108 which is executable by the system 100. The system 100 executes the code instrumenter 128b to analyze the source code 130 ("SC 1") and generate new source code 132 ("SC 2") by supplementing source code 130 with additional lines of code for marshaling, unmarshaling and marking modified data objects.

The data files 136a, 136b, and 136c constitute libraries ("LIB 1", "LIB 2", and "LIB 3", respectively) of detailed information about programming language in which the source code 130 ("SC 1") may be written. For example, the library 136a may contain information about C++ languages, and the library 136b about Java languages, and so on. The code instrumenter source code 128a, for example, may be compiled with library 136a stored in storage medium 116, if that library contains information about the programming language in which the source code 130 is written. The source code 132 ("SC 2") is stored in a storage medium 112, and then compiled to obtain object code 134 ("OC"), which is stored in the storage medium 114. The object code 134 is executable in the system 100 or any suitable target system, which may be a fault-tolerant system and/or a distributed system.

Figure 2:
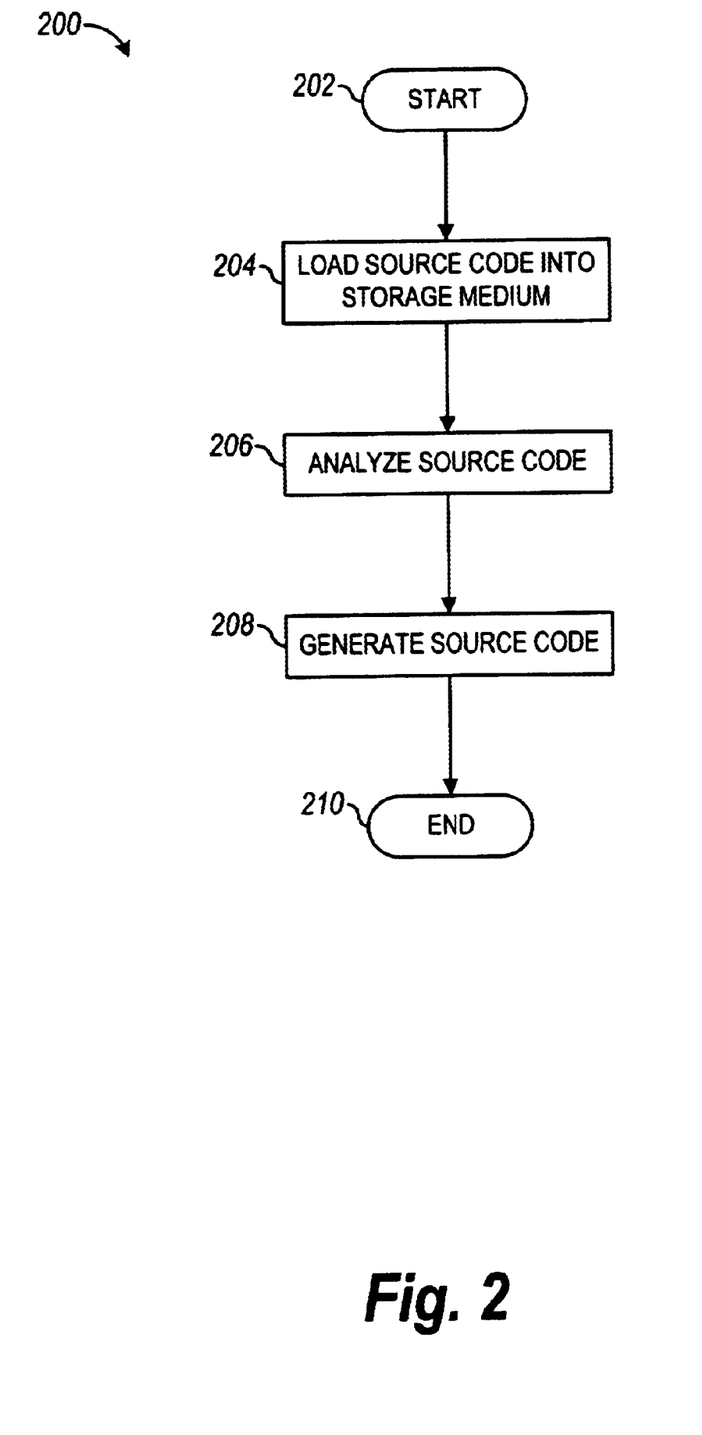
FIG. 2 is a high-level flow chart depicting control logic for automatically modifying source code for marshaling, unmarshaling, and marking modified data objects.

FIG. 2 illustrates a flowchart 200 of control logic implemented by the computer 102 (FIG. 1) for generating source code 132 from source code 130 by executing the code instrumenter 128b in accordance with a preferred embodiment of the present invention. In step 202, execution of the code instrumenter 128b is initiated and, in step 204 the computer 102 loads the source code 130 into the storage medium 108. Code instrumenter 128b must have complete information about the programming language in which source code 130 is written. This does not mean however that a different code instrumenter is required to analyze source code written in a different programming language. If the information about language in which the source code 130 is written is contained in the code library 136a, 136b, or 136c, then the source code 130 may be compiled using the information available in the code library 136a, 136b, or 136c.

A programmer may readily select the appropriate library with which to compile code instrumenter source code 128a. The programmer may edit a few lines of code instrumenter source code 128a to have it compiled with the right library. Alternatively, the programmer may put some indicators in source code 128a to make the code instrumenter source code 128a automatically compile the source code with the right library.

At step 206, the computer 102 analyzes the source code 130, in a manner well-known in the art of parsing and semantic analysis, to identify lines of code that modify data objects. The analysis may be a sequential or non-sequential analysis of the source code 130. However, by way of example, the process for analyzing source code 130 sequentially is described below, with respect to FIG. 3. After determining the programming language used to design the source code 130, the computer 102 locates all data objects defined in source code 130 by referring to the library 136a, 136b or 136c, depending on the programming language used in the source code 136.

At step 208, the computer 102 modifies source code 132 by inserting additional lines in source code 130 to generate source code 132. The code instrumenter 128b instructs the computer 102 to determine what to insert and where to insert it. For the purpose of determining the most appropriate and most efficient locations to insert additional code lines for marshaling, unmarshaling and marking data objects, code instrumenter source code 128a may include code for implementing an algorithm which may be based on a theory of data flow analysis. Such algorithms for analyzing the structure of source code based on data flow analysis are considered to be well-known in the art and, therefore, will not be discussed in further detail herein.

By way of example, simplified for the sake of illustration, if, in step 408, source code 130 contains a data structure 130 such as the following code segment 130a:

```
class A {
    int a;
    int b;
    String c;
    OtherClass d;
}
```
then, code instrumenter 128b may generate source code 132 containing the following corresponding source code segment 132a:
```
class A {
    int a;
    int b;
    string c;
    OtherClass d;
    public void marshal(buffer rawData) {
        baseMarshaler.addInt(rawData, a);
        baseMarshaler.addInt(rawData, b);
        baseMarshaler.addstring(rawData, c);
        d.marshal(rawData);
    }
    public void unmarshal(buffer rawData) {
        a = baseMarshaler.getInt(rawData);
        b = baseMarshaler.getInt(rawData);
        c = baseMarshaler.getstring(rawData);
        d.unmarshal(rawData);
    }
}
```

The code added between 130a and 132a will marshal and unmarshal an object of the class. It may call other routines to marshal and unmarshal types intrinsic to the language (such as the "int" and the "string" in the example), or other classes (such as "OtherClass" in the example).

Likewise, the operation for marking data objects as modified may be implemented as follows. If the source code 130 contained the following source code segment 130b:

```
public void setValue(int x) {
    value = x;
}
``` then, the code instrumenter 128b would generate source code 132 containing the following corresponding source code segment 132b:
public void setValue(int x) {
   value=x;

```
if (not dataAlreadyModified) {
    dataAlreadyModified = true;
    addItemToModifiedList ();
}
```

In step 210, execution of the code instrumenter 128b is terminated.

In the code segment 130b above, the variable defined as "value" has its value modified. In a distributed fault-tolerant system, such data modification would be propagated to other processes, or computers, in the system (not shown) that contain the same data item. The code segment 132b marks the data as modified and adds it to a data object ("DO") list 138 of data objects ready to be marshaled and propagated. If the data has already been modified, it is not necessary to mark the data and add it to the list since this will have already been done. At some point in the future, such as at the end of a transaction or some other time that a system designer (e.g., a system architect, performance engineer, or the like), may deem appropriate to transfer the data, the CPU will examine the list of modified items and propagate them to the other processes in the system. Notably, in the prior art (not shown), a programmer would be responsible for adding the difference between the code segments 130b and 132b. In accordance with the present invention, the instrumenter adds the code automatically.

Figure 3:
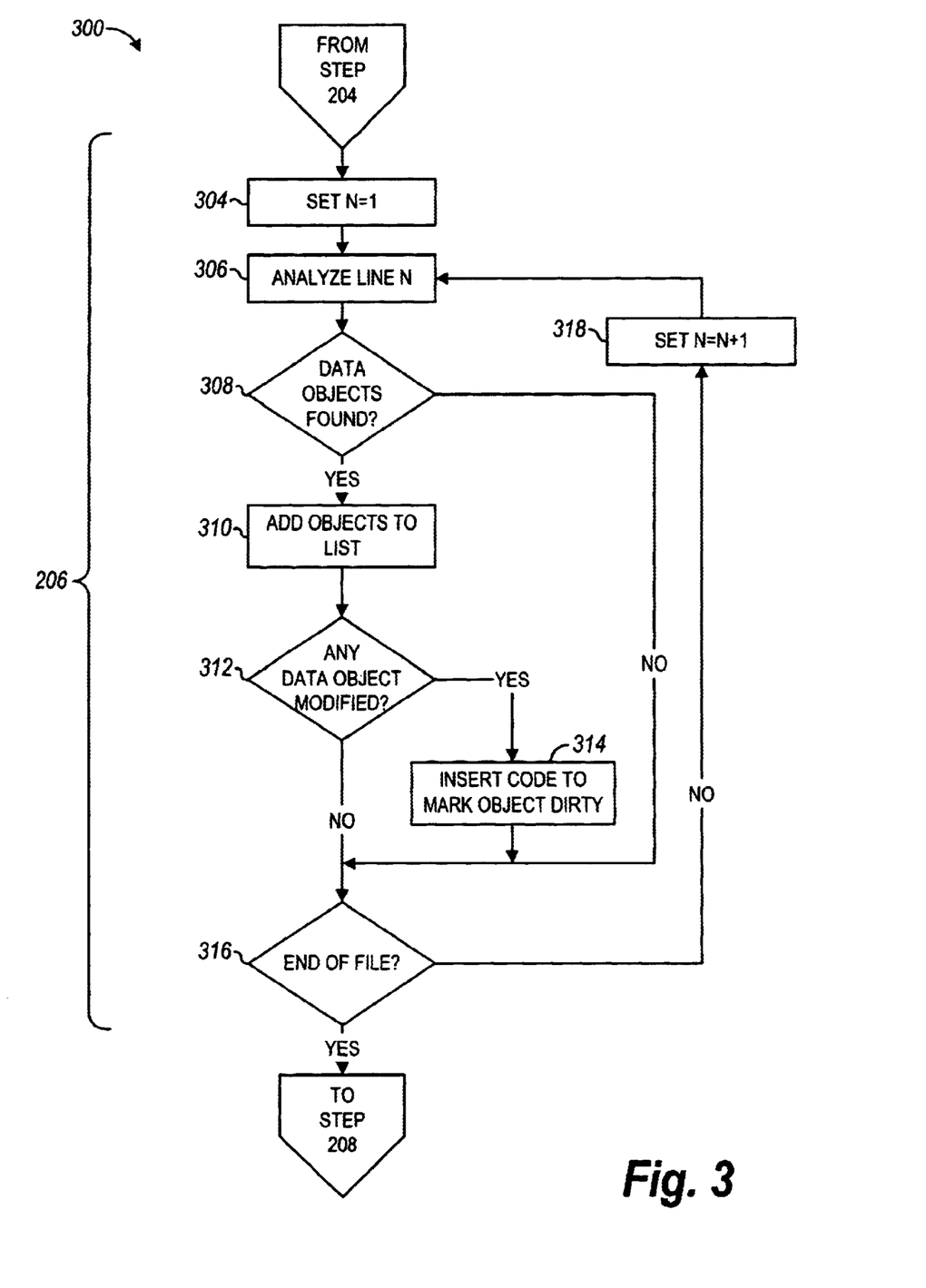
FIG. 3 is a flow chart depicting control logic for analyzing the structure of source code before modifying source code for marshaling, unmarshaling, and marking modified data objects.

FIG. 3 illustrates a flowchart 300 which exemplifies control logic implemented by the computer 102 (FIG. 1) for performing the step 206 of the flow chart 200 described above in FIG. 2, in which the computer 102 analyzes source code 130. By way of example, a sequential analysis is shown, and the computer 102 analyzes every line of the source code 130, line-by-line. Alternatively, the analysis of the source code 130 may be performed character-by-character, block-by-block, or page-by-page. It should also be noted that the analysis may be performed non-sequentially.

Upon completion of the step 204 (FIG. 2), execution of step 206 begins at step 304, wherein a variable N, representing a line number of the source code 130, is initialized to N=1. At the step 306, the line N is analyzed to identify and retrieve information in any library 136a, 136b, or 136c which may be used to decipher the line N.

At step 308, the code instrumenter 128b determines whether data object(s) are used in line N. If, in step 308, a determination is made that data objects are declared in line N, then execution proceeds to step 310. In step 310, the code instrumenter 128b adds the data object(s) identified in step 308 to the data object ("DO") list 138 stored in the storage medium 118. If, in step 308, a determination is made that data objects are not declared in line N, then execution proceeds to step 316, discuss below.

Upon completion of step 310, execution proceeds to step 312. In step 312, a determination is made whether any data object has been modified. If any data object has been modified, then execution proceeds to step 314 wherein code is inserted to the modified data object to mark it as dirty. Execution then proceeds to step 316.

At step 316, a determination is made whether N is equal to the total number of lines of source code 130. If, in step 316, a determination is made that N is equal to the total number of lines of source code 130, then execution proceeds to step 208 (FIG. 2). If, in step 316, a determination is made that N does not equal the total number of lines of source code 130, then in step 318, N is incremented by 1 and execution returns to step 306.

As mentioned above, the line-by-line analysis described with respect to FIG. 3 may alternatively be performed by a block-by-block or page-by-page analysis by simply modifying the step 306 to analyze blocks or pages instead of lines.

Figure 4:
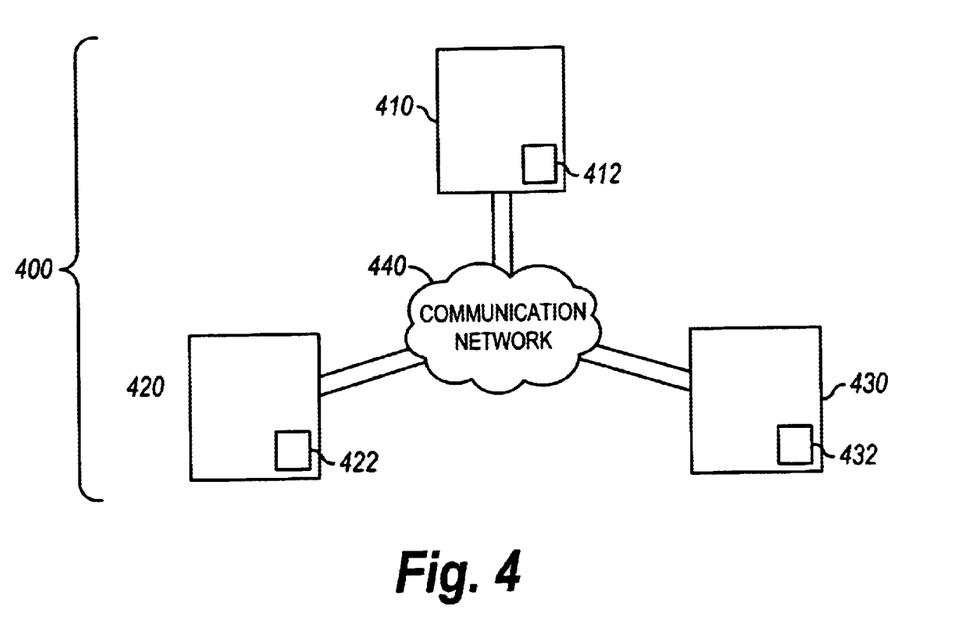
FIGS. 4 and 5 illustrates an example of a fault-tolerant distributed system consisting of three processors between which the application program running in the system transfers data objects by performing the operations of marshaling, unmarshaling and marking modified data objects.
Figure 5:
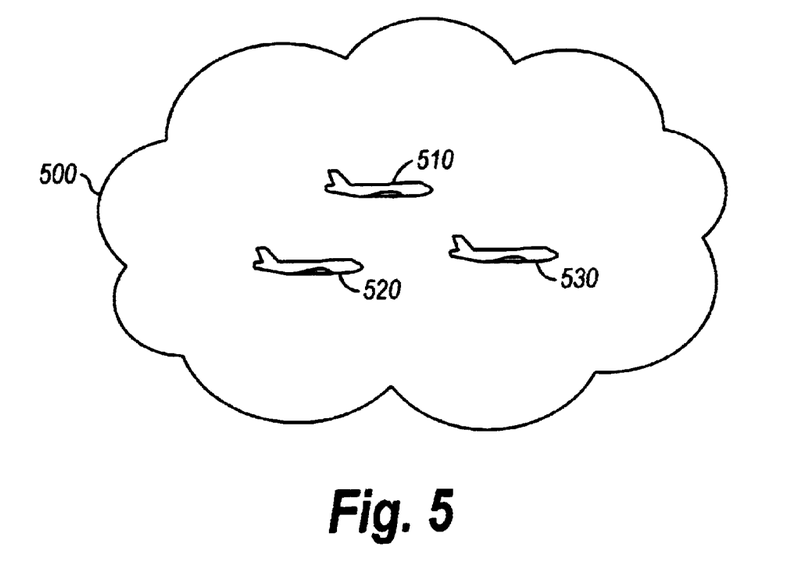

FIGS. 4 and 5 exemplify an application of the present invention by way of a simple distributed system 400 comprising three processors 410, 420 and 430 interconnected through a communications network 440, such as a Totem System or other Virtual Synchrony system, wherein the object code 134 is to be executed. Each processor 410, 420 and 430 may comprise a computer system, such as a mainframe computer, a workstation, or the like, having a memory defining a respective buffer 412, 422, and 432, configured for storing modified data objects, and may be similar to the computer 102 described above with respect to FIG. 1. While each processor 410, 420 and 430 exclusively controls data object(s) assigned to it, communication between the computers is essential as long as the distributed system 400 performs a common task.

FIG. 5 depicts an airspace 500 having three aircraft 510, 520, and 530 which require an air traffic control system to prevent an air crash by maintaining safe separation in flight and safe sequencing for takeoff and landing. The three aircraft 510, 520, and 530 are controlled by the respective processors 410, 420 and 430. The processors 410, 420 and 430 need to communicate with one another, because each processor must have updated information regarding the velocity, position, and the like, of the aircraft 510, 520, and 530 in order to control its respective aircraft. Such information is contained in data objects, a list of which data objects is maintained in the data file 138 stored in the storage medium 118 (FIG. 1) of a respective processor 410, 420, or 430. Whenever a data object is modified and is necessary for other computers to perform the common task, as is generally the case in an air traffic control system, the modified data object is copied to the other computers.

Air traffic must be controlled by a fault-tolerant system; thus the distributed system 400 must be fault tolerant. To achieve such fault tolerance, in the system 400, each computer is designated as a primary unit for the aircraft it respectively controls, and as a standby unit for other aircraft. Accordingly, in the present example, the processor 410 is designated as a primary unit for the aircraft 510, and as a standby unit for the aircraft 520 and 530; the processor 420 is designated as a primary unit for the aircraft 520, and as a standby unit for the aircraft 510 and 530; and the processor 430 is designated as a primary unit for the aircraft 530, and as a standby unit for the aircraft 510 and 520.

Fault tolerance is maintained in the system 400 by transferring any modified data objects in a primary unit to one or more standby units, so that if a primary unit fails and loses control of its assigned data objects, a standby unit may take over. For example, if the processor 410 fails, the processor 420 and/or 430 may assume control of the aircraft 510. Although detailed mechanisms for determining standby units may vary depending on specific system design, consistent replication of data objects in at least one standby unit is essential to maintain fault-tolerance. Therefore, source code for marshaling, unmarshaling and marking modified objects must be incorporated in each application program executed by a respective computer to consistently replicate modified data objects. Accordingly, the code instrumenter 128*b* is configured to generate source code 132 readily operable in a distributed or fault-tolerant system or both.

By the use of the present invention, the time-consuming and error-prone process of writing additional lines of code for marshaling, unmarshaling, and marking modified data objects in every application program running on a distributed system or a fault-tolerant system is automated. As a result, application programs may be developed much more quickly and efficiently and with fewer errors than is possible under the prior art. Accordingly, coding applications for a fault-tolerant or distributed system may be significantly streamlined, thereby reducing the time required to introduce a new product to the market.

It is understood that the present invention can take many forms and embodiments. Accordingly, several variations may be made in the foregoing without departing from the spirit or the scope of the invention. For example, the invention may be configured to re-analyze code that has already been modified, or where the marshaling and dirty marking of code was generated by a designer. The instrumenter may remove unneeded operations, and add operations that are newly required. The operation of the invention may be controlled with the use of control tags, such as special comments added to the code. The operation of marking the object dirty and adding the marshaling code may be separated into two separate operations. Separate computers may perform the various functions of the instrumenter, such as semantic analysis, code insertion, compilation, and the like. A new source code file may be generated with changes generated by the instrumenter, or the code may be modified in place. A set of data changes that occur on a single transaction may be transmitted together in an atomic message, as described in U.S. patent application Ser. No. 09/252,140, filed Feb. 18, 1999, on behalf of Corey Minyard, and entitled "ATOMIC TRANSMISSION OF MULTIPLE MESSAGES IN A VIRTUAL SYNCHRONY ENVIRONMENT", which is hereby incorporated in its entirety by reference.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for automatically, modifying source code operable in a computer network having two or more interconnected processors, the method comprising the steps of:

storing information sufficient to identify source code used to modify data objects in one or more programming languages;

loading source code of an application into storage memory of a computer;

storing code modification segments in a library of code modification segments:

based upon the programming language of the source code, automatically selecting the appropriate code modification segment or segments from the library without requiring operator input;

based on the programming language of the source code, automatically analyzing the loaded source code to identify lines of code that modify data objects and automatically modifying the source code to mark objects dirty; and based on the programming language of the source code, automatically and without requiring operator input modifying the loaded source code to enable the source code to marshal data objects associated with the application into a buffer, and to unmarshal the marshaled data objects from the buffer.

2. The method of claim 1 wherein the buffer is coupled to the computer network.

3. The method of claim 1 wherein the step of modifying further comprises modifying the source code to enable the source code to mark modified data objects.

4. The method of claim 1 wherein the computer network is a fault-tolerant system.

5. The method of claim 1 wherein the computer network is a distributed system.

6. The method of claim 1 wherein the computer network is a Totem system.

7. The method of claim 1 wherein the computer network is a Transmission Control Protocol/Internet Protocol (TCP/IP) system.

8. The method of claim 1 wherein the step of analyzing comprises the steps of:

locating the data objects associated with the application; and determining appropriate places in the source code in which to insert additional lines of code for marshaling data objects associated with the application, and for unmarshaling the marshaled data objects.

9. The method of claim 1 wherein the step of analyzing comprises the steps of:

locating the data objects associated with the application; and determining appropriate places in the source code in which to insert additional lines of code for marshaling data objects associated with the application, for unmarshaling the marshaled data objects, and for marking modified data objects.

10. A computer for automatically modifying source code operable in a computer network having two or more interconnected processors, the computer comprising:

a storage medium for storing information used to identify the source code used to modify a data object in one or more programming languages, for storing code modification segments in a library of code modification segments and for storing a code instrumenter, the code instrumenter comprising object code executable in the programming language of the source code to automatically and without requiring operator input, select the appropriate code modification segment or segments from the library and to modify source code to marshal data objects associated with the application into a buffer, and to unmarshal the marshaled data objects from the network buffer; and a processor coupled to the storage medium, the processor capable of executing the code instrumenter.

11. The computer of claim 10, wherein the object code is further executable to modify source code storage to mark modified data objects.

12. The computer of claim 10, wherein the computer network is a fault-tolerant system.

13. The computer of claim 10, wherein the computer network is a distributed system.

14. The computer of claim 10, wherein the computer network is a Totem network.

15. The method of claim 10 wherein the computer network is a Transmission Control Protocol/Internet Protocol (TCP/IP) system.

16. The computer of claim 10 further comprising an interface coupled to the storage medium, and an input/output system coupled to the interface, the input/output system being configured to enable a user of the computer to instruct the processor to execute the code instrumenter.

17. The computer of claim 10, wherein the storage medium is configured to store original source code of the application desired to run in the computer network.

18. The computer of claim 10, wherein the processor is configured to compile the modified source code.

19. A computer program product for use in a computer system having a memory, a processor and an input/output system, the computer program product comprising a computer usable storage medium wherein object code is recorded, the object code comprising:

program logic for loading source code into the memory of the computer system;

program logic for storing information regarding a source code in one or more programming languages sufficient to identify the source code used to modify data objects;

program logic for storing a library of code modifications into the memory of the computer system;

program logic for automatically and without requiring operator decision-making selecting the appropriate code modification segment or segments from the library and automatically analyzing the source code based on the programming language of the source code to identify lines of code that modify data objects and automatically and without requiring operator input modifying the source code to mark objects dirty; and program logic for automatically modifying source code to marshal data objects associated with the application into a buffer, source code for unmarshaling the marshaled data objects.

20. The computer program product of claim 19 wherein the program logic further modifies the source code to mark modified data objects.

21. The computer program product of claim 19, wherein the program logic for analyzing further comprises:

program logic for locating data objects associated with the application; and program logic for determining appropriate places in the source code in which to insert code for marshaling data objects associated with the application, and for unmarshaling the marshaled data objects.

22. The computer program product of claim 19, wherein the program logic for analyzing further comprises:

program logic for locating data objects associated with the application; and program logic for determining appropriate places in the source code in which to insert code for marshaling data objects associated with the application, for unmarshaling the marshaled data objects, and for marking modified data objects.

* * * * *

UNITED STATES PATENT AND TRADEMARK OFFICE
CERTIFICATE OF CORRECTION

PATENT NO. : 6,658,660 B1
DATED : December 2, 2003
INVENTOR(S) : Trenton Corey Minyard It is certified that error appears in the above-identified patent and that said Letters Patent is hereby corrected as shown below:

Column 3,
Line 33, after 110, please delete the second occurrence of "110".
Line 34, after "116", please delete the additional occurrences of "116".

Column 5,
Line 6, please delete "String" and insert -- string --.
Line 17, please delete "baseMarshaler.addstring(rawData, c)" and insert
-- baseMarshaler.addString(rawData, c) --.
Line 22, please delete "c=baseMarshaler.getstring(rawData)" and insert
-- baseMarshaler.getString(rawData) --.

Signed and Sealed this

Sixth Day of July, 2004

JON W. DUDAS
*Acting Director of the United States Patent and Trademark Office*